United States Patent [19]

Ivan

[11] Patent Number: 5,645,659
[45] Date of Patent: Jul. 8, 1997

[54] TIRE ADD-ON TRACTION APPARATUS

[76] Inventor: Vadnjal Ivan, Bazoviska 15, 66320 Portoroz, Slovenia

[21] Appl. No.: 626,810

[22] Filed: Apr. 3, 1996

[51] Int. Cl.$^6$ .......................... B60C 27/20; B60C 27/14
[52] U.S. Cl. ........................ 152/216; 152/225 R
[58] Field of Search ........................ 152/187, 189, 152/190, 191, 213 R, 214, 216, 217, 218, 225 R, 225 C

[56] References Cited

U.S. PATENT DOCUMENTS

| | | | |
|---|---|---|---|
| D. 265,081 | 6/1982 | Zielinski | D12/154 |
| 1,257,145 | 2/1918 | Stern | 152/216 |
| 1,327,538 | 1/1920 | Etter | 152/216 |
| 2,581,770 | 1/1952 | Pittinger | 152/216 |
| 2,730,406 | 1/1956 | Fitzgerald | 152/216 X |
| 2,897,868 | 8/1959 | Putt et al. | 152/216 |
| 3,016,078 | 1/1962 | Schmidt | 152/216 |
| 4,089,359 | 5/1978 | Jones | 152/216 |
| 4,192,367 | 3/1980 | Chabot | 152/225 C |
| 4,209,049 | 6/1980 | Regensburger | 152/216 |
| 4,287,926 | 9/1981 | Wong | 152/225 C |
| 4,355,451 | 10/1982 | Thomas | 152/221 X |
| 4,549,591 | 10/1985 | Hyggen | 152/216 X |
| 5,156,695 | 10/1992 | Martin | 152/216 |

*Primary Examiner*—Michael W. Ball
*Assistant Examiner*—Francis J. Lorin

[57] ABSTRACT

A tire add-on traction apparatus includes a ring-shaped housing which includes a ring-shaped base wall which has a circular inner edge portion and a circular outer edge portion. A hoop-shaped inner wall is connected to the inner edge portion of the base wall, and a hoop-shaped outer wall is connected to the outer edge portion of the base wall. The inner wall includes a plurality of inner access apertures distributed circumferentially around the inner wall. The outer wall includes a plurality of outer access apertures distributed circumferentially around the outer wall. Each of the inner access apertures is in alignment with one of the outer access apertures. A plurality of traction elements are supported by the housing. Each traction element includes a tire-contacting portion and a radial adjustment portion which extends through one of the outer access apertures and one of the inner access apertures. Each of the radial adjustment portions includes an associated longitudinal axis and a plurality of transversely oriented teeth arrayed longitudinally adjacent to the associated longitudinal axis. A spiral screw assembly is supported by the housing and includes a ring-shaped screw base and a spiral screw element. Portions of the spiral screw element are meshed with the teeth on the radial adjustment portions. Retainers are connected to the housing for retaining the spiral screw assembly within the housing. A plurality of wrench connectors are connected to the screw base of the spiral screw assembly.

14 Claims, 4 Drawing Sheets

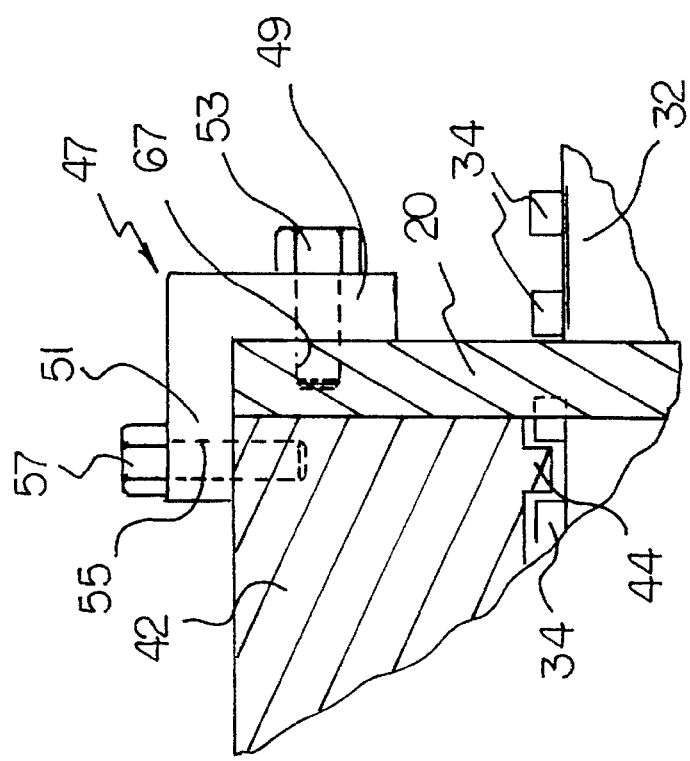
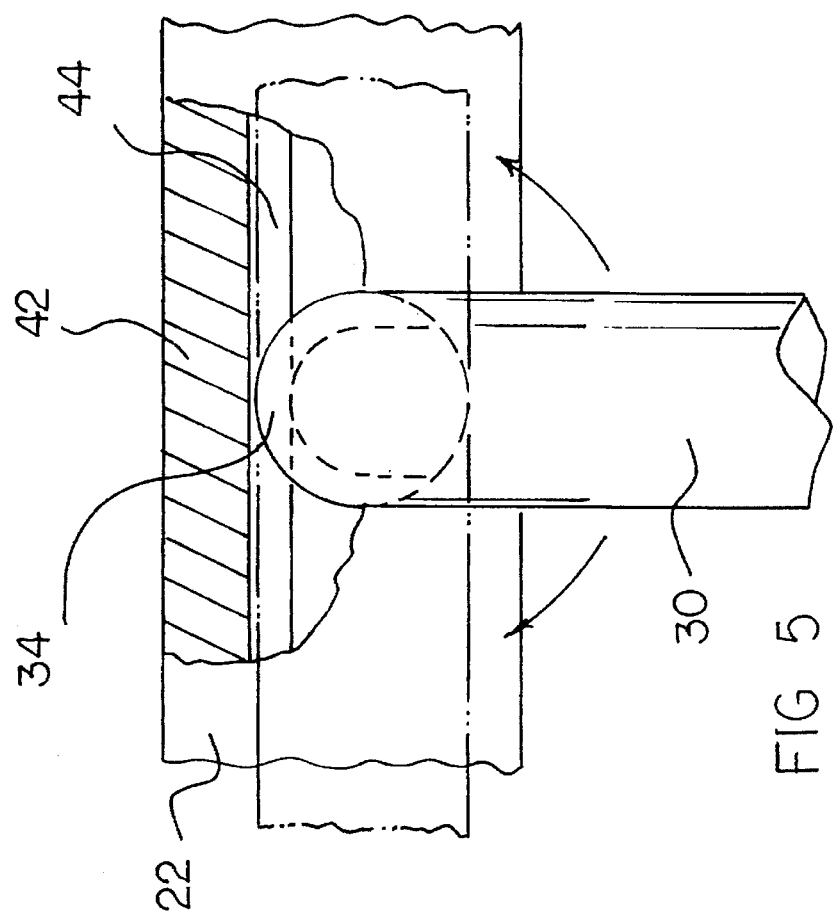

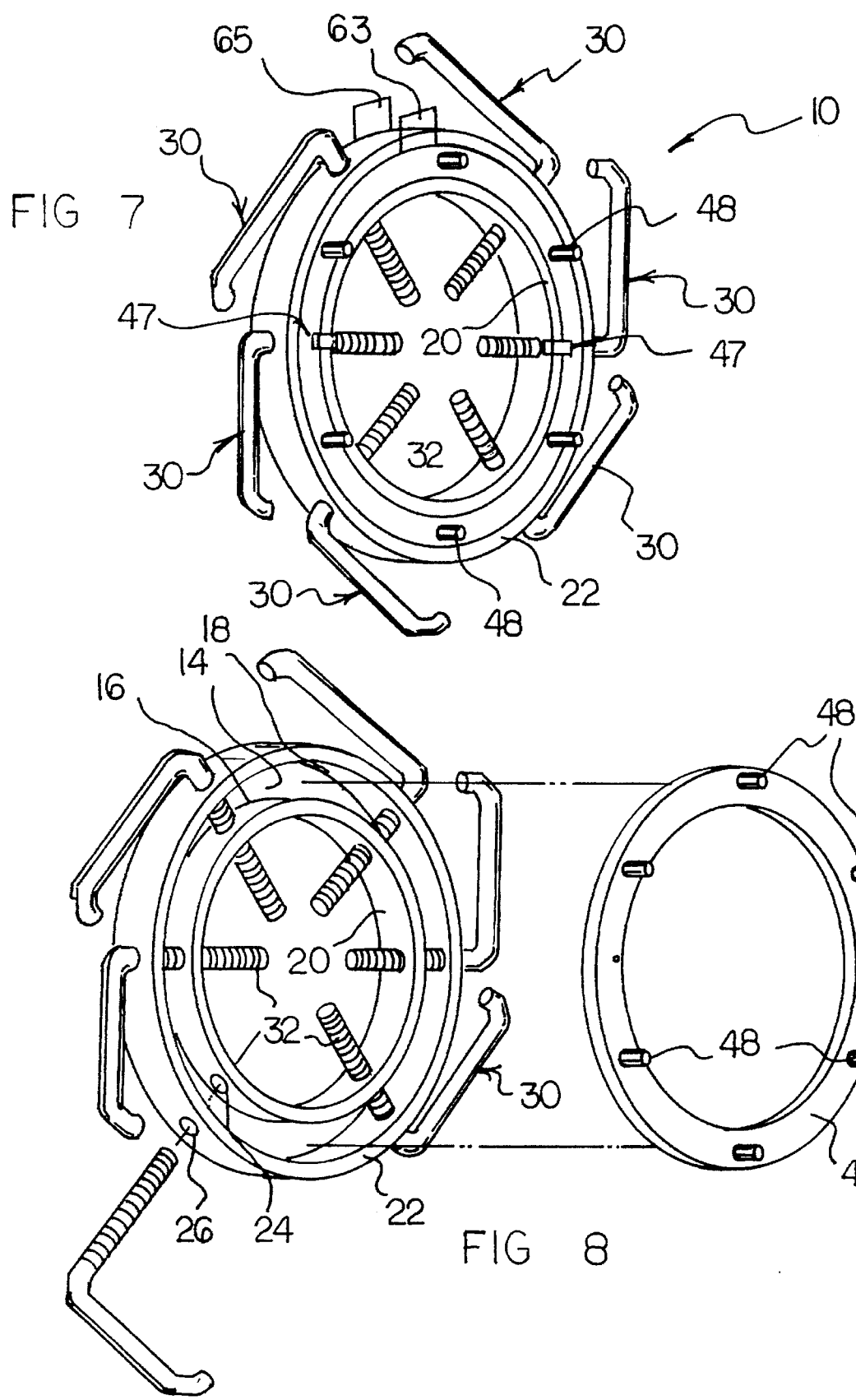

TIRE ADD-ON TRACTION APPARATUS

BACKGROUND OF THE INVENTION

1. Field of the Invention

The present invention relates generally to devices for increasing traction of tires, and, more particularly, to devices that can be manually added to tires to increase their traction.

2. Description of the Prior Art

Icy and snowy road conditions often seriously reduce the effective traction of tires. A number of techniques have been employed to increase the traction of tires in icy and snowy conditions. For example, tire chains may be installed on tires. Each chain link is a rigid structure, but the overall chain structure is a very limp structure. As a result, chains often have the tendency to flop around even when installed on a tire. To avoid such floppy characteristics, it would be desirable if a device added to a tire to increase traction did not include floppy structures.

Aside from chains, throughout the years, a number of innovations have been developed relating to devices that can be manually added to tires to increase tire traction, and the following U.S. patents are representative of some of those innovations: U.S. Pat. Nos. 4,192,367, 4,209,049, 4,287,926, 4,355,451, 5,156,695, and Des. 265,081. More specifically, each of the above-cited patents discloses an add-on device for a tire that spans over a portion of the hub of the wheel. For purposes of a desirable appearance, it would be desirable if an add-on for a tire did not span over a portion of the hub of a wheel.

Moreover, each of U.S. Pat. Nos. 4,192,367, 4,287,926, 4,355,451, and Des. 265,081 discloses an add-on structure that is not symmetrical around the hub of the wheel. As a result, when the wheels spin, they will be out of balance. In this respect, it would be desirable if an add-on device for a tire were provided which is symmetrically arranged around the hub of the wheel on which the tire is mounted.

Still other features would be desirable in a tire add-on traction device. For example, if one traction element were bent or otherwise damaged, it would be desirable if an individual traction element could be easily replaced without the need to disassemble or remove other traction elements from the device.

During most of the time, a tire add-on traction device may not be needed. That is, road conditions may not be icy and snowy. Therefore, during most of the time, a tire add-on traction device must be placed in storage. In this respect, it would be desirable if an add-on device for a tire were provided that can be arranged for easy and convenient storage.

Thus, while the foregoing body of prior art indicates it to be well known to use tire add-on traction devices, the prior art described above does not teach or suggest a tire add-on traction apparatus which has the following combination of desirable features: (1) does not include floppy structures; (2) does not span over a portion of the hub of a wheel; (3) is symmetrically arranged around the hub of the wheel on which the tire is mounted; (4) provides that an individual traction element can be easily replaced without the need to disassemble or remove other traction elements from the device; and (5) can be arranged for easy and convenient storage. The foregoing desired characteristics are provided by the unique tire add-on traction apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a tire add-on traction apparatus which includes a ring-shaped housing which includes a ring-shaped base wall which has a circular inner edge portion and a circular outer edge portion. A hoop-shaped inner wall is connected to the inner edge portion of the base wall, and a hoop-shaped outer wall is connected to the outer edge portion of the base wall. The inner wall includes a plurality of inner access apertures distributed circumferentially around the inner wall. The outer wall includes a plurality of outer access apertures distributed circumferentially around the outer wall. Each of the inner access apertures is in alignment with one of the outer access apertures. A plurality of traction elements are supported by the housing. Each traction element includes a tire-contacting portion and a radial adjustment portion connected to the tire-contacting portion. Each of the radial adjustment portions extends through one of the outer access apertures and one of the inner access apertures. Each of the radial adjustment portions includes an associated longitudinal axis and a plurality of teeth arrayed longitudinally adjacent to the associated longitudinal axis. Each of the teeth is oriented transversely with respect to the associated longitudinal axis. A spiral screw assembly is supported by the housing. The spiral screw assembly includes a ring-shaped screw base and a spiral screw element supported by the screw base. Portions of the spiral screw element are meshed with the teeth on the radial adjustment portions of the traction elements. Retainer means are connected to the housing for retaining the screw base and the spiral screw element within the housing. A plurality of wrench connectors are connected to the screw base of the spiral screw assembly and extend away from the spiral screw element.

The base wall, the inner wall, and the outer wall of the housing are formed as a substantially U-shaped, one-piece structure. The screw base and the spiral screw element of the spiral screw assembly are formed as a one-piece structure. In each of the traction elements, the tire-contacting portion and the radial adjustment portion are formed as a one-piece structure. In each traction element, the tire-contacting portion is oriented at a substantially right angle with respect to the radial adjustment portion. For each traction element, the tire-contacting portion includes an inner side and an outer side, and the outer side includes a plurality of ridges to improve traction on a slippery road surface.

For each traction element, the tire-contacting portion includes a distal descending portion, a substantially horizontal intermediate portion connected to the distal descending portion, and a proximal descending portion connected to the intermediate portion. The radial adjustment portion is connected to the proximal descending portion. For each of the tire-contacting portions of each of the traction elements, the distal descending portion, the intermediate portion, and the proximal descending portion are formed as a U-shaped, one-piece structure.

The retainer means includes a pair of right-angled retention brackets each of which includes a first bracket leg connected to either the inner wall or the outer wall of the housing and a second bracket leg projecting toward an opposite wall of the housing. The second bracket leg retains the screw base and the spiral screw element of the spiral screw assembly within the housing. Each of the second bracket legs of the retention brackets includes a threaded lock-bolt-receiving channel and a threaded lock bolt retained in the lock-bolt-receiving channel. The spiral screw element is oriented substantially at a right angle with respect to the screw base.

The wrench connectors are distributed equidistant from one another on an outer side of the screw base. The wrench connectors are in a form of hexagonal bolt heads. In addition, the outer access apertures are distributed equidistant from one another on the outer wall of the housing, and the inner access apertures are distributed equidistant from one another on the inner wall of the housing.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tire add-on traction apparatus which has all of the advantages of the prior art and none of the disadvantages.

It is another object of the present invention to provide a new and improved tire add-on traction apparatus which may be easily and efficiently manufactured and marketed.

It is a further object of the present invention to provide a new and improved tire add-on traction apparatus which is of durable and reliable construction.

An even further object of the present invention is to provide a new and improved tire add-on traction apparatus which is susceptible of a low cost of manufacture with regard to both materials and labor, and which accordingly is then susceptable of low prices of sale to the consuming public, thereby making such tire add-on traction apparatus available to the buying public.

Still yet a further object of the present invention is to provide a new and improved tire add-on traction apparatus which does not include floppy structures.

Still another object of the present invention is to provide a new and improved tire add-on traction apparatus that does not span over a portion of the hub of a wheel.

Yet another object of the present invention is to provide a new and improved tire add-on traction apparatus which is symmetrically arranged around the hub of the wheel on which the tire is mounted.

Even another object of the present invention is to provide a new and improved tire add-on traction apparatus that provides that an individual traction element can be easily replaced without the need to disassemble or remove other traction elements from the device.

Still a further object of the present invention is to provide a new and improved tire add-on traction apparatus which can be arranged for easy and convenient storage.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 5 is an enlarged cross-sectional view of a portion of the embodiment of the invention shown in FIG. 1 taken along line 5—5 thereof.

FIG. 6 is an enlarged cross-sectional view of a portion of the embodiment of the invention shown in FIG. 1 taken along line 6—6 thereof.

FIG. 7 is a perspective view of the embodiment of the invention shown in FIG. 1 removed from the tire and wheel and placed in a storage mode.

FIG. 8 is a partially exploded perspective view of the embodiment of the invention shown in FIG. 7.

DESCRIPTION OF THE PREFERRED EMBODIMENT

With reference to the drawings, a new and improved tire add-on traction apparatus embodying the principles and concepts of the present invention will be described.

Figure 1:
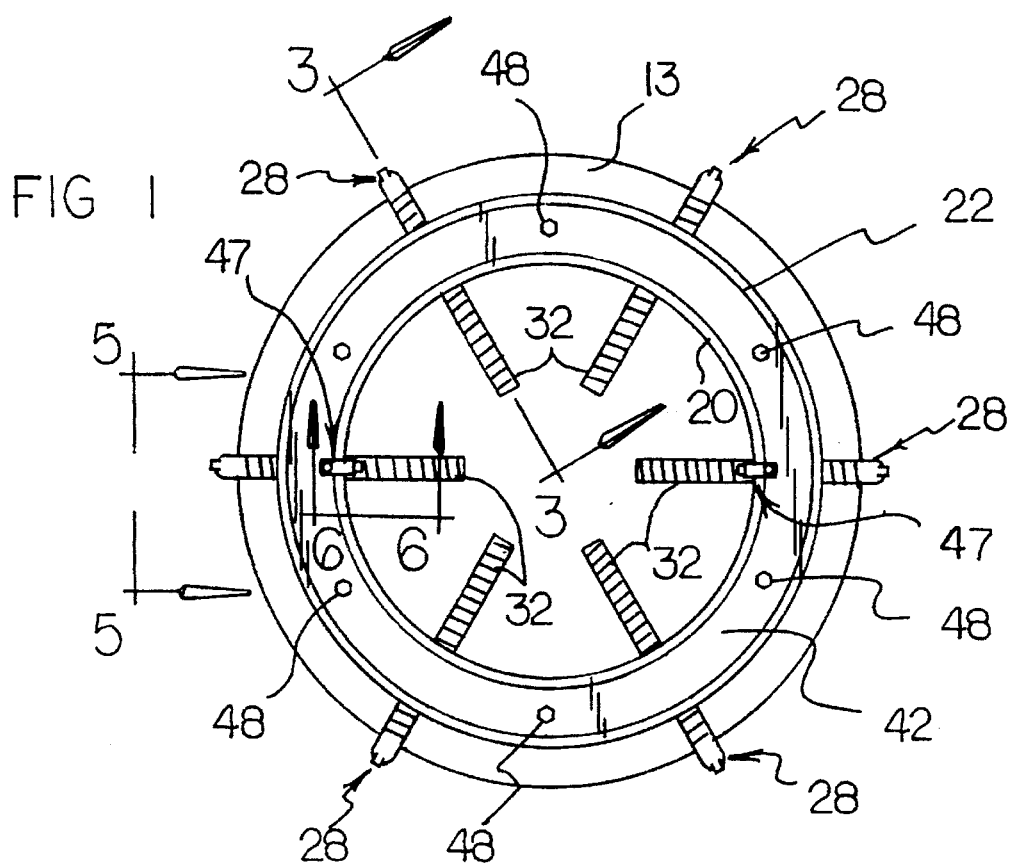
FIG. 1 is a side view showing a preferred embodiment of the tire add-on traction apparatus of the invention installed on a tire mounted on a wheel.
Figure 2:
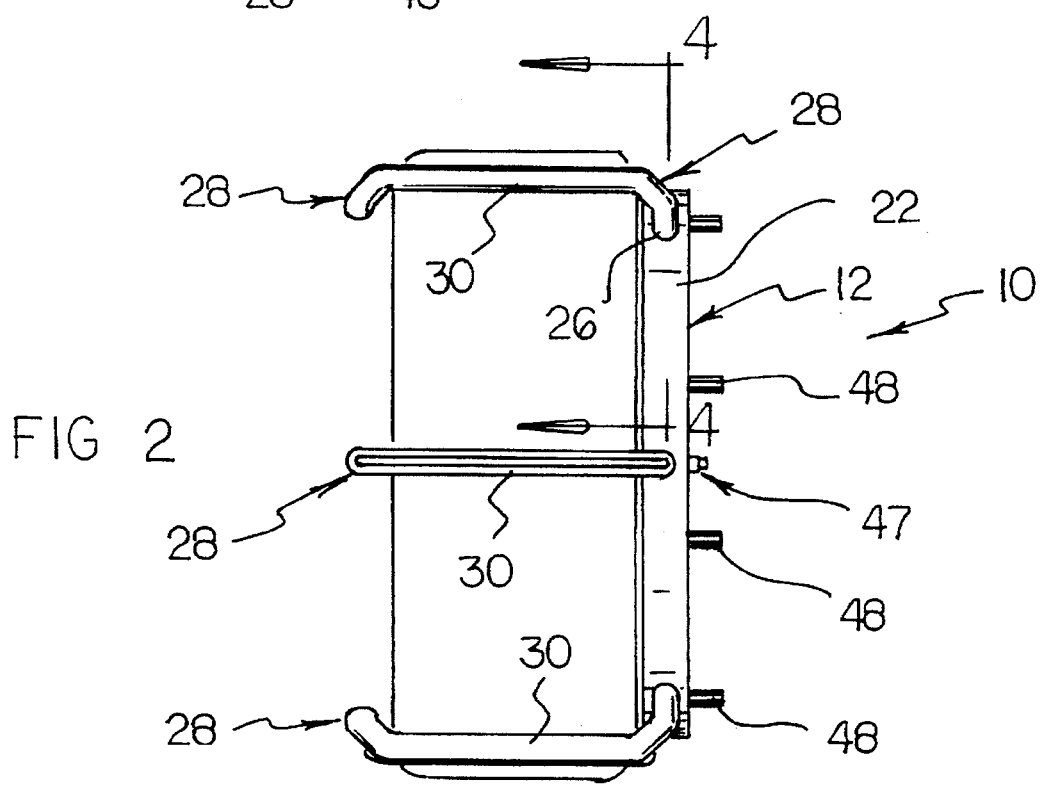
FIG. 2 is a front view of the embodiment of the tire add-on traction apparatus shown in FIG. 1.
Figure 3:
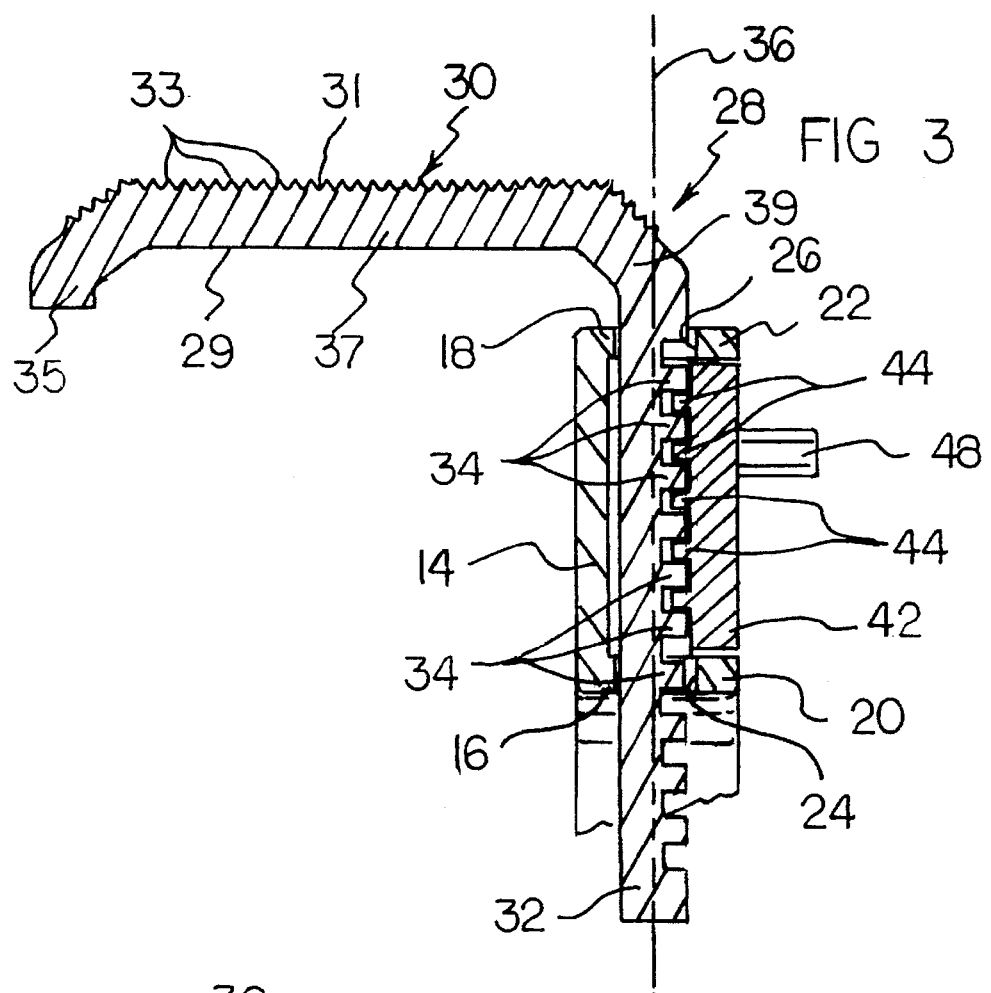
FIG. 3 is an enlarged cross-sectional view of a portion of the embodiment of the invention shown in FIG. 1 taken along line 3—3 thereof and removed from the tire and wheel.
Figure 4:
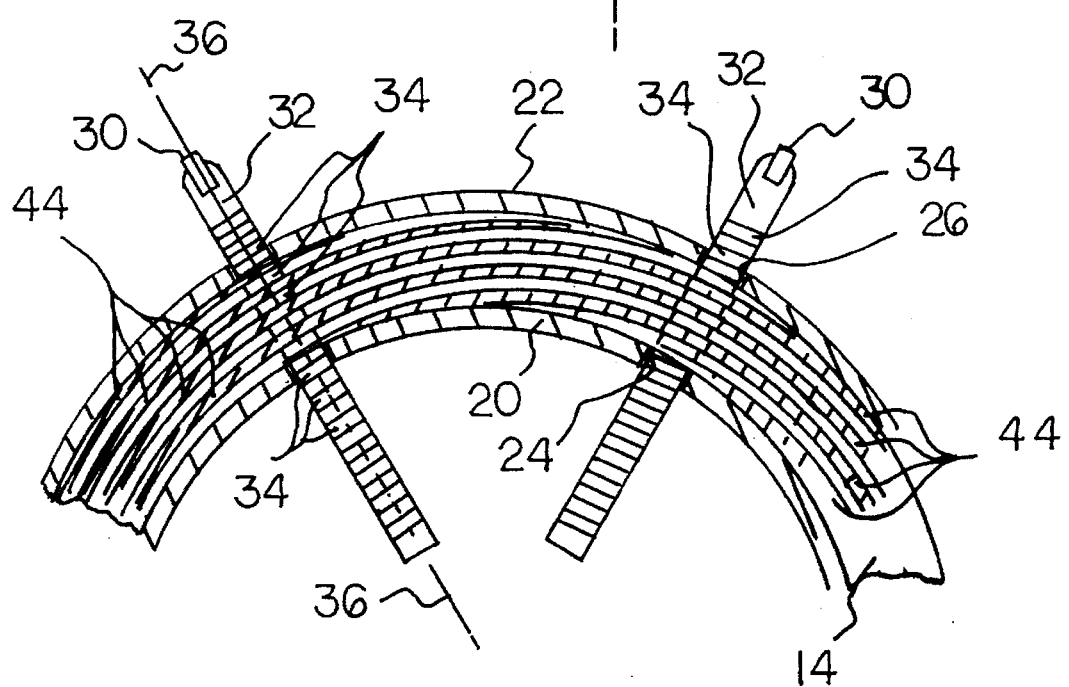
FIG. 4 is an enlarged cross-sectional view of a portion of the embodiment of the invention shown in FIG. 2 taken along line 4—4 thereof.

Turning to FIGS. 1–8, there is shown an exemplary embodiment of the tire add-on traction apparatus of the invention generally designated by reference numeral 10. It is understood that, preferably, one tire add-on traction apparatus 10 of the invention can be added to each tire on each drive wheel. More specifically, in its preferred form, tire add-on traction apparatus 10 includes a ring-shaped housing 12 which includes a ring-shaped base wall 14 which has a circular inner edge portion 16 and a circular outer edge portion 18. A hoop-shaped inner wall 20 is connected to the inner edge portion 16 of the base wall 14, and a hoop-shaped outer wall 22 is connected to the outer edge portion 18 of the base wall 14. The inner wall 20 includes a plurality of inner access apertures 24 distributed circumferentially around the inner wall 20. The outer wall 22 includes a plurality of outer access apertures 26 distributed circumferentially around the outer wall 22. Each of the inner access apertures 24 is in alignment with one of the outer access apertures 26. A plurality of traction elements 28 are supported by the housing 12. Each traction element 28 includes a tire-contacting portion 30 and a radial adjustment portion 32 connected to the tire-contacting portion 30. Each of the radial adjustment portions 32 extends through one of the outer access apertures 26 and one of the inner access apertures 24. Each of the radial adjustment portions 32 includes an associated longitudinal axis 36 and a plurality of teeth 34 arrayed longitudinally adjacent to the associated longitudinal axis 36. Each of the teeth 34 is oriented transversely with respect to the associated longitudinal axis 36. A spiral screw assembly is supported by the housing 12. The spiral screw assembly includes a ring-shaped screw base 42 and a spiral screw element 44 supported by the screw base 42. Portions of the spiral screw element 44 are meshed with the teeth 34 on the radial adjustment portions 32 of the traction elements 28. Retainer means are connected to the housing 12 for retaining the screw base 42 and the spiral screw element 44 within the housing 12. A plurality of wrench connectors 48 are connected to the screw base 42 of the spiral screw assembly and extend away from the spiral screw element 44.

The base wall 14, the inner wall 20, and the outer wall 22 of the housing 12 are formed as a substantially U-shaped, one-piece structure. The screw base 42 and the spiral screw element 44 of the spiral screw assembly are formed as a one-piece structure. In each of the traction elements 28, the tire-contacting portion 30 and the radial adjustment portion 32 are formed as a one-piece structure. In each traction element 28, the tire-contacting portion 30 is oriented at a substantially right angle with respect to the radial adjustment portion 32. For each traction element 28, the tire-contacting portion 30 includes an inner side 29 and an outer side 31, and the outer side 31 includes a plurality of ridges 33.

For each traction element 28, the tire-contacting portion 30 includes a distal descending portion 35, a substantially horizontal intermediate portion 37 connected to the distal descending portion 35, and a proximal descending portion 39 connected to the intermediate portion 37. The radial adjustment portion 32 is connected to the proximal descending portion 39. For each of the tire-contacting portions 30 of each of the traction elements 28, the distal descending portion 35, the intermediate portion 37, and the proximal descending portion 39 are formed as a U-shaped, one-piece structure.

The retainer means includes a pair of right-angled retention brackets 47 each of which includes a first bracket leg 49 connected to either the inner wall 20 or the outer wall 22 of the housing 12 and a second bracket leg 51 projecting toward an opposite wall of the housing 12. The second bracket leg 51 retains the screw base 42 and the spiral screw element 44 of the spiral screw assembly within the housing 12. A threaded bolt 53 is screwed into a threaded hole 67 in the inner wall 20 of the housing 12 to connect the first bracket leg 49 to the inner wall 20 as shown in FIG. 6. Each of the second bracket legs 51 of the retention brackets 47 includes a threaded lock-bolt-receiving channel 55 and a threaded lock bolt 57 retained in the lock-bolt-receiving channel 55. The spiral screw element 44 is oriented substantially at a right angle with respect to the screw base 42.

The wrench connectors 48 are distributed equidistant from one another on an outer side of the screw base 42. The wrench connectors 48 are in a form of hexagonal bolt heads. In addition, the outer access apertures 26 are distributed equidistant from one another on the outer wall 22 of the housing 12, and the inner access apertures 24 are distributed equidistant from one another on the inner wall 20 of the housing 12.

In using the tire add-on traction apparatus 10 of the invention, a tire 13 on a motor vehicle is selected. A common wrench (not shown), such as is commonly used for turning lug nuts on a wheel, is obtained and used to turn a hexagonal wrench connector 48 in a counterclockwise direction. This causes the spiral screw element 44 of the spiral screw assembly to rotate and, by being meshed with the teeth 34 of the radial adjustment portions 32 of the traction elements 28, causes the tire-contacting portions 30 of the traction elements 28 to move radially away from the hub of the wheel. When the traction elements 28 are extended radially outward sufficiently, the tire add-on traction apparatus 10 is moved toward the tire 13 so that the tire-contacting portions 30 are over nearby portions of the tire 13. Then, the wrench connectors 48 are turned in a clockwise direction. This causes the spiral screw element 44 of the spiral screw assembly to rotate in the opposite direction, which, in turn, causes the radial adjustment portions 32 of the traction element 28 to move radially inward toward the hub of the wheel. As a result, the tire-contacting portions 30 of the traction elements 28 contact the tire 13. When the wrench connectors 48 are turned sufficiently, the tire-contacting portions 30 of the traction elements 28 firmly grip the tire 13. Then, the lock bolt 57 can be turned so that it engages the screw base 42 of the spiral screw assembly in the manner of a set screw. In this way, the relative position of the spiral screw assembly with respect to the housing 12 is locked into a fixed position, and the tire add-on traction apparatus 10 of the invention is locked onto the tire 13. If desired, a plurality of wells can be present in the outer surface of the screw base 42 so that the lock bolt 57 can engage such wells to provide greater locking efficiency. The combination clamping action of the distal descending portion 35, the intermediate portion 37, and the proximal descending portion 39 of each tire-contacting portion 30 serve to firmly grip the tread portion and portions of the side walls of the tire 13. The ridges 33 on the tire-contacting portions 30 improve traction of the tire-contacting portions 30 on a slippery road surface.

When the tire add-on traction apparatus 10 is no longer to be used, the lock bolt 57 is turned to loosen its locking action on the spiral screw assembly. Then, the wrench connectors 48 are turned in a counterclockwise direction. This causes the radial adjustment portions 32 of the traction elements 28 to extend outward causing the tire-contacting portions 30 to be moved away from the tire 13. When the tire-contacting portions 30 of the traction elements 28 are far enough away from the tire 13, the tire add-on traction apparatus 10 of the invention is removed from the tire 13 and the wheel.

To occupy a relatively small mount of space when in storage, the tire add-on traction apparatus 10 is arranged as shown in FIG. 7. More specifically, the tire-contacting portions 30 of the traction elements 28 are rotated around the longitudinal axes 36 of the radial adjustment portions 32 so that the tire-contacting portions 30 lie within a region defined by a top plane 63 in which the top edge of the outer wall 22 of the housing 12 lies and a bottom plane 65 in which the bottom edge of the outer wall 22 lies. When the tire-contacting portions 30 of the traction elements 28 are oriented in this way, the tire add-on traction apparatus 10 of the invention is in a storage mode. When a tire add-on traction apparatus 10 is in a storage mode, it has a substantially tire-like aspect, and one or more of the tire add-on traction apparatuses 10 can be readily stored in a portion of a motor vehicle set aside for storage of a spare tire.

It is noted that, if desired, the spiral direction of the spiral screw element 44 can be reversed to that a counterclockwise rotation of the spiral screw element 44 causes the radial adjustment portions 32 of the traction elements 28 to move inward, and so that a clockwise rotation of the spiral screw element 44 causes the radial adjustment portions 32 to move outward.

The components of the tire add-on traction apparatus of the invention can be made from inexpensive and durable metal and plastic materials. It is preferable that the materials are rust resistant or rust proof.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved tire add-on traction apparatus that is low in cost, relatively simple in design and operation, and which may advantageously be used without including floppy structures. With the invention, a tire add-on traction apparatus is provided which does not span over a portion of the hub of a wheel. With the invention, a tire add-on traction apparatus is provided which is symmetrically arranged around the hub of the wheel on which the tire is mounted. With the invention, a tire add-on traction apparatus provides that an individual traction element can be easily replaced without the need to disassemble or remove other traction elements from the device. With the invention, a tire add-on traction apparatus is provided which can be arranged for easy and convenient storage.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by LETTERS PATENT of the United States is as follows:

1. A tire add-on traction apparatus, comprising:

a ring-shaped housing which includes a ring-shaped base wall which has a circular inner edge portion and a circular outer edge portion, a hoop-shaped inner wall connected to said inner edge portion of said base wall, and a hoop-shaped outer wall connected to said outer edge portion of said base wall, wherein said inner wall includes a plurality of inner access apertures distributed circumferentially around said inner wall, wherein said outer wall includes a plurality of outer access apertures distributed circumferentially around said outer wall, and wherein each of said inner access apertures is in alignment with one of said outer access apertures, a plurality of traction elements supported by said housing, wherein each traction element includes a tire-contacting portion and a radial adjustment portion connected to said tire-contacting portion, wherein each of said radial adjustment portions extends through one of said outer access apertures and one of said inner access apertures, wherein each of said radial adjustment portions includes an associated longitudinal axis and a plurality of teeth arrayed longitudinally adjacent to said associated longitudinal axis, wherein each of said teeth is oriented transversely with respect to said associated longitudinal axis, a spiral screw assembly supported by said housing, wherein said spiral screw assembly includes a ring-shaped screw base and a spiral screw element supported by said screw base, wherein portions of said spiral screw element are meshed with said teeth on said radial adjustment portions of said traction elements, retainer means, connected to said housing, for retaining said screw base and said spiral screw element in said housing, and a plurality of wrench connectors connected to said screw base of said spiral screw assembly and extending away from said spiral screw element.

2. The apparatus of claim 1 wherein said base wall, said inner wall, and said outer wall of said housing are formed as a substantially U-shaped, one-piece structure.

3. The apparatus of claim 1 wherein said screw base and said spiral screw element of said spiral screw assembly are formed as a one-piece structure.

4. The apparatus of claim 1 wherein, in each of said traction elements, said tire-contacting portion and said radial adjustment portion are formed as a one-piece structure.

5. The apparatus of claim 1 wherein, for each traction element, said tire-contacting portion is oriented at a substantially right angle with respect to said radial adjustment portion.

6. The apparatus of claim 1 wherein, for each traction element, said tire-contacting portion includes an inner side and an outer side, and wherein said outer side includes a plurality of ridges.

7. The apparatus of claim 1 wherein, for each traction element, said tire-contacting portion includes a distal descending portion, a substantially horizontal intermediate portion connected to said distal descending portion, and a proximal descending portion connected to said intermediate portion, wherein said radial adjustment portion is connected to said proximal descending portion.

8. The apparatus of claim 7 wherein, for each of said tire-contacting portions of each of said traction elements, said distal descending portion, said intermediate portion, and said proximal descending portion are formed as a U-shaped, one-piece structure.

9. The apparatus of claim 1 wherein said retainer means includes a pair of right-angled retention brackets each of which includes a first bracket leg connected to either said inner wall or said outer wall of said housing and a second bracket leg projecting toward an opposite wall of said housing, wherein said second bracket leg retains said screw base and said spiral screw element of said spiral screw assembly within said housing.

10. The apparatus of claim 9 wherein each of said second bracket legs of said retention brackets includes a threaded lock-bolt-receiving channel and a threaded lock bolt retained in said lock-bolt-receiving channel.

11. The apparatus of claim 1 wherein said spiral screw element is oriented substantially at a right angle with respect to said screw base.

12. The apparatus of claim 1 wherein said wrench connectors are distributed equidistant from one another on an outer side of said screw base.

13. The apparatus of claim 1 wherein said wrench connectors are in a form of hexagonal bolt heads.

14. The apparatus of claim 1 wherein:
said outer access apertures are distributed equidistant from one another on said outer wall of said housing, and
said inner access apertures are distributed equidistant from one another on said inner wall of said housing.

* * * * *